(12) United States Patent
Trinh et al.

(10) Patent No.: US 11,258,864 B2
(45) Date of Patent: Feb. 22, 2022

(54) COMMUNICATION DEVICE CAPABLE OF INTERACTING WITH DEVICES ON A NETWORK

(71) Applicant: Mitel Networks ULC, Ottawa (CA)

(72) Inventors: Trung (Tim) Trinh, Nepean (CA); Alain Michaud, Kenata (CA)

(73) Assignee: Mitel Networks Corporation, Ottawa (CA)

( * ) Notice: Subject to any disclaimer, the term of this patent is extended or adjusted under 35 U.S.C. 154(b) by 167 days.

(21) Appl. No.: 16/264,548

(22) Filed: Jan. 31, 2019

(65) Prior Publication Data

US 2019/0166207 A1 May 30, 2019

Related U.S. Application Data

(62) Division of application No. 13/134,396, filed on Jun. 6, 2011, now Pat. No. 10,225,354.

(51) Int. Cl.
| | |
|---|---|
| *H04L 29/08* | (2006.01) |
| *H04L 29/06* | (2006.01) |
| *H04L 12/24* | (2006.01) |
| *G06F 21/10* | (2013.01) |
| *G06F 21/33* | (2013.01) |

(Continued)

(52) U.S. Cl.
CPC .......... *H04L 67/148* (2013.01); *G06F 21/10* (2013.01); *G06F 21/335* (2013.01); *G06F 21/6272* (2013.01); *H04L 41/0806* (2013.01); *H04L 63/08* (2013.01); *H04L 65/1073* (2013.01); *H04L 65/4069* (2013.01); *H04W 4/023* (2013.01); *H04W 4/21* (2018.02); *G06F 2221/2111* (2013.01); *H04L 63/0492* (2013.01)

(58) Field of Classification Search
None
See application file for complete search history.

(56) References Cited

U.S. PATENT DOCUMENTS

| | | | | |
|---|---|---|---|---|
| 7,418,511 B2* | 8/2008 | Takechi | ............ | H04L 29/12405 709/229 |
| 7,693,160 B2* | 4/2010 | Gobara | ............... | H04L 61/2517 370/401 |

(Continued)

FOREIGN PATENT DOCUMENTS

| | | |
|---|---|---|
| EP | 1089162 A2 | 4/2001 |
| EP | 1549021 A1 | 6/2005 |

(Continued)

*Primary Examiner* — Backhean Tiv

(57) ABSTRACT

A system and method for seamless exchange and interaction of multimedia content between communication devices in a network are disclosed. The method can include the discovery and identification of devices within proximity of a sending device. The found devices can be authenticated through unique identifiers established during registration. Connection requirements can be determined based on the identifiers associated with the found devices and the sending device. In turn, the sender can establish a connection with the found devices using the connection requirements. The sending device can share or serve as a remote control to redirect and navigate the content, with a simple action or a gesture command, to the found device. The shared multimedia content, can either reside on the sender's mobile device or on a remote server within a connected network.

20 Claims, 5 Drawing Sheets

(51) Int. Cl.
  *G06F 21/62* (2013.01)
  *H04W 4/02* (2018.01)
  *H04W 4/21* (2018.01)
  *H04L 67/148* (2022.01)
  *H04L 41/0806* (2022.01)
  *H04L 65/1073* (2022.01)
  *H04L 65/61* (2022.01)

(56) References Cited

U.S. PATENT DOCUMENTS

| | | | | |
|---|---|---|---|---|
| 7,774,505 | B2* | 8/2010 | Kang | H04L 67/38 709/249 |
| 7,895,338 | B2* | 2/2011 | Leaute | H04L 29/06 709/227 |
| 7,925,763 | B2* | 4/2011 | Cai | G06F 9/485 709/227 |
| 7,953,400 | B2* | 5/2011 | Lee | H04L 63/0492 455/418 |
| 8,085,759 | B2* | 12/2011 | Neuhaus | H04L 65/1006 370/352 |
| 8,121,057 | B1 | 2/2012 | Botha et al. | |
| 8,243,702 | B2* | 8/2012 | Maruyama | G06F 21/36 370/338 |
| 8,248,967 | B2* | 8/2012 | Nagy | H04L 61/2007 370/254 |
| 8,775,668 | B2* | 7/2014 | Adriazola | H04L 65/80 709/238 |
| 9,178,922 | B2* | 11/2015 | Adriazola | H04L 65/4084 |
| 10,277,641 | B2* | 4/2019 | Trinh | H04L 65/4015 |
| 2002/0021307 | A1* | 2/2002 | Glenn | H04L 51/04 715/753 |
| 2002/0040397 | A1* | 4/2002 | Choi | H04L 61/20 709/226 |
| 2002/0099827 | A1* | 7/2002 | Shah | H04L 69/10 709/227 |
| 2002/0112064 | A1* | 8/2002 | Eastvold | H04L 29/06 709/230 |
| 2002/0147791 | A1* | 10/2002 | Choi | H04L 12/2818 709/217 |
| 2002/0157002 | A1* | 10/2002 | Messerges | H04N 21/63345 713/155 |
| 2002/0197956 | A1* | 12/2002 | Annola | H04W 76/10 455/41.1 |
| 2002/0198965 | A1* | 12/2002 | Kraft | H04L 63/08 709/219 |
| 2003/0093459 | A1* | 5/2003 | Dowling | H04L 29/06 709/201 |
| 2003/0172184 | A1* | 9/2003 | Kong | H04L 61/1511 709/245 |
| 2003/0186697 | A1* | 10/2003 | Bazin | H04W 8/005 455/434 |
| 2004/0039827 | A1* | 2/2004 | Thomas | H04L 67/2804 709/228 |
| 2004/0141472 | A1* | 7/2004 | Haddad | H04W 92/18 370/310 |
| 2004/0205245 | A1* | 10/2004 | Le Pennec | H04L 61/2578 709/245 |
| 2004/0260761 | A1* | 12/2004 | Leaute | H04L 29/06 709/201 |
| 2005/0015584 | A1* | 1/2005 | Takechi | H04L 29/12924 713/151 |
| 2005/0022171 | A1* | 1/2005 | Langkafel | G06F 9/541 717/136 |
| 2005/0078679 | A1* | 4/2005 | Henry | H04L 12/4625 370/395.2 |
| 2005/0091380 | A1* | 4/2005 | Gonen | H04L 65/4038 709/227 |
| 2005/0108320 | A1* | 5/2005 | Lord | H04L 29/12047 709/201 |
| 2005/0132003 | A1* | 6/2005 | Philyaw | G06Q 30/02 709/204 |
| 2005/0153729 | A1* | 7/2005 | Logan | H04M 1/72457 455/550.1 |
| 2005/0262254 | A1* | 11/2005 | Sherwani | H04L 29/06027 709/231 |
| 2006/0031559 | A1 | 2/2006 | Sorokopud et al. | |
| 2006/0209802 | A1* | 9/2006 | Kang | H04L 61/00 370/352 |
| 2006/0239190 | A1* | 10/2006 | Kumar | H04L 63/02 370/230 |
| 2006/0293028 | A1* | 12/2006 | Gadamsetty | H04W 12/06 455/411 |
| 2007/0027367 | A1* | 2/2007 | Oliver | G16H 40/63 600/300 |
| 2007/0136768 | A1* | 6/2007 | Kumar | H04N 5/23293 725/81 |
| 2007/0156897 | A1* | 7/2007 | Lim | H04L 63/20 709/225 |
| 2007/0168447 | A1 | 7/2007 | Chen et al. | |
| 2007/0192806 | A1* | 8/2007 | Park | H04N 21/41407 725/80 |
| 2007/0219817 | A1* | 9/2007 | Wu | G06Q 10/10 705/80 |
| 2007/0286100 | A1* | 12/2007 | Saaranen | H04L 67/1068 370/260 |
| 2007/0288754 | A1* | 12/2007 | Kaji | H04L 67/14 713/175 |
| 2008/0031161 | A1* | 2/2008 | Osthus | H04L 65/1006 370/261 |
| 2008/0057868 | A1* | 3/2008 | Chang | H04M 1/6066 455/41.2 |
| 2008/0112354 | A1* | 5/2008 | Toutonghi | H04W 8/005 370/328 |
| 2008/0155062 | A1* | 6/2008 | Rabold | H04L 29/06027 709/219 |
| 2008/0165765 | A1* | 7/2008 | Neuhaus | H04L 29/06027 370/352 |
| 2009/0007244 | A1 | 1/2009 | Monahan et al. | |
| 2009/0019507 | A1* | 1/2009 | White | H04N 7/17318 725/110 |
| 2009/0055530 | A1* | 2/2009 | Pince | H04W 52/0277 709/224 |
| 2009/0124284 | A1* | 5/2009 | Scherzer | H04M 1/72457 455/552.1 |
| 2009/0205017 | A1* | 8/2009 | Yabe | G06F 21/6209 726/1 |
| 2009/0235342 | A1* | 9/2009 | Manion | H04L 63/08 726/7 |
| 2009/0254839 | A1 | 10/2009 | Kripalana et al. | |
| 2009/0264070 | A1* | 10/2009 | Lim | G06Q 30/0261 455/41.2 |
| 2009/0325491 | A1* | 12/2009 | Bell | H04M 3/56 455/41.3 |
| 2009/0327247 | A1 | 12/2009 | Jia et al. | |
| 2010/0027777 | A1 | 2/2010 | Gupta et al. | |
| 2010/0069068 | A1* | 3/2010 | Clark | H04W 4/12 455/435.1 |
| 2010/0081419 | A1* | 4/2010 | Chiang | H04M 1/2757 455/416 |
| 2010/0094996 | A1* | 4/2010 | Samaha | G06Q 10/10 709/224 |
| 2010/0128701 | A1* | 5/2010 | Nagaraja | H04W 76/10 370/338 |
| 2010/0135279 | A1* | 6/2010 | Petersson | H04L 65/1026 370/352 |
| 2010/0146076 | A1* | 6/2010 | Adriazola | H04L 65/4084 709/219 |
| 2010/0161813 | A1* | 6/2010 | Avasarala | H04L 65/1069 709/228 |
| 2010/0177671 | A1* | 7/2010 | Qiu | H04L 29/12018 370/310 |
| 2010/0181373 | A1* | 7/2010 | Murakami | H04N 7/17318 235/375 |
| 2010/0228978 | A1* | 9/2010 | Kudo | H04L 65/1069 713/168 |
| 2010/0269159 | A1* | 10/2010 | Oertel | H04N 7/152 726/4 |

(56) References Cited

U.S. PATENT DOCUMENTS

| | | | |
|---|---|---|---|
| 2010/0274859 A1* | 10/2010 | Bucuk | H04L 63/0492 709/206 |
| 2010/0293289 A1* | 11/2010 | Hsu | H04W 8/14 709/232 |
| 2010/0312832 A1* | 12/2010 | Allen | H04L 65/403 709/204 |
| 2010/0312903 A1* | 12/2010 | Miyata | H04L 63/0421 709/228 |
| 2011/0009112 A1* | 1/2011 | Noh | G08C 17/00 455/420 |
| 2011/0039584 A1* | 2/2011 | Merrett | H04W 4/14 455/466 |
| 2011/0072078 A1* | 3/2011 | Chai | G06F 16/489 709/203 |
| 2011/0087775 A1* | 4/2011 | Lee | H04L 67/104 709/224 |
| 2011/0131520 A1* | 6/2011 | Al-Shaykh | H04N 21/43615 715/772 |
| 2011/0138413 A1* | 6/2011 | Hjelm | H04N 21/25891 725/34 |
| 2011/0200006 A1* | 8/2011 | Kwon | H04W 36/0011 370/331 |
| 2011/0268418 A1* | 11/2011 | Jones | H04M 3/42221 386/200 |
| 2011/0270922 A1* | 11/2011 | Jones | H04L 65/1093 709/204 |
| 2011/0270991 A1* | 11/2011 | Zawacki | H04L 67/04 709/227 |
| 2011/0274041 A1* | 11/2011 | Perras | H04L 65/1093 370/328 |
| 2011/0276669 A1* | 11/2011 | Wei | H04L 67/1074 709/222 |
| 2012/0015605 A1* | 1/2012 | Sole | H04W 12/06 455/41.3 |
| 2012/0026971 A1* | 2/2012 | Khandelia | H04W 36/005 370/331 |
| 2012/0030579 A1* | 2/2012 | Morard | H04L 67/148 715/740 |
| 2012/0079086 A1* | 3/2012 | Miettinen | H04L 51/00 709/222 |
| 2012/0092438 A1 | 4/2012 | Guzman Suarez et al. | |
| 2012/0100868 A1* | 4/2012 | Kim | H04W 8/005 455/456.1 |
| 2012/0117250 A1* | 5/2012 | Santamaria | H04L 61/256 709/227 |
| 2012/0163235 A1* | 6/2012 | Ho | H04L 67/1061 370/254 |
| 2012/0173622 A1* | 7/2012 | Toledano | H04L 65/4076 709/204 |
| 2012/0185291 A1* | 7/2012 | Ramaswamy | G06Q 10/1095 705/7.19 |
| 2012/0209930 A1* | 8/2012 | Plumb | H04L 67/18 709/206 |
| 2012/0243469 A1* | 9/2012 | Klein | H04W 4/021 370/328 |
| 2012/0260282 A1* | 10/2012 | Dasher | H04N 21/25816 725/37 |
| 2012/0272148 A1* | 10/2012 | Strober | G06F 3/01 715/716 |
| 2012/0287022 A1* | 11/2012 | Queen | G09G 5/006 345/2.1 |
| 2012/0306622 A1* | 12/2012 | Trinh | H04L 65/4069 340/10.1 |
| 2012/0311038 A1* | 12/2012 | Trinh | H04W 4/023 709/204 |
| 2012/0322376 A1* | 12/2012 | Couse | H04M 1/72412 455/41.2 |
| 2013/0007231 A1* | 1/2013 | Forssell | H04L 41/082 709/221 |
| 2013/0346553 A1* | 12/2013 | Shin | H04W 76/23 709/217 |
| 2014/0032900 A1* | 1/2014 | Donahue | G06F 40/197 713/165 |
| 2014/0280731 A1* | 9/2014 | Adriazola | H04L 65/4084 709/217 |
| 2016/0261654 A1* | 9/2016 | Trinh | H04L 65/4015 |
| 2019/0166206 A1* | 5/2019 | Trinh | H04W 4/023 |
| 2019/0166207 A1* | 5/2019 | Trinh | G06F 21/6272 |

FOREIGN PATENT DOCUMENTS

| | | |
|---|---|---|
| EP | 1635574 A2 | 3/2006 |
| EP | 1708528 A1 | 10/2006 |
| WO | WO 2005/114967 A2 | 12/2005 |
| WO | WO 2010/010637 A1 | 1/2010 |

* cited by examiner

COMMUNICATION DEVICE CAPABLE OF INTERACTING WITH DEVICES ON A NETWORK

CROSS REFERENCE TO RELATED APPLICATIONS

This application is a divisional of and claims priority to U.S. patent application Ser. No. 13/134,396 filed on Jun. 6, 2011, the disclosure of which, is incorporated herein by reference to the extent such disclosure does not conflict with the present disclosure.

TECHNICAL FIELD

This disclosure generally relates to communications, and more particularly, to a system and method for seamlessly exchanging and interacting with multimedia content between devices in proximity on a network.

BACKGROUND

The proliferation of smart phones and the rising popularity of tablet-like devices, with their rich multimedia capabilities, have created demands for seamless collaboration between these devices in personal and enterprise networks. Gradually, these devices have been introduced into the workplace creating a diversified mobile client working environment. Seamless collaboration between these devices becomes more difficult especially with the variety of available devices coupled with the differences in operating systems, versions, vendors, and models.

Due to technology limitations and form factor of touch screen mobile and tablet devices, innovative approaches have been employed to minimize the typing required for interactions between the users and the devices. For example, the use of gesturing, speech recognition and drag and drop capabilities, instead of typing in the required information, have become a trend. Being able to collaborate and share information without the need to type in information, such as a destination address, URL or authentication credentials, becomes a necessity rather than a desire for touch screen or small form-factor mobile devices.

Information can be shared and exchanged through different methods such as File Transfer Protocol (FTP), Hypertext Transfer Protocol (HTTP or HTTPs) (web session), Virtual Private Network (VPN), Remote Desktop Protocol (RDP), etc. These methods require manual authentication or credentials to be exchanged as part of the collaborative session initiation. Such requirement makes it impractical for the touch-screen devices that are dominantly relied on by drag and drop or gesture based interactions.

A proximity session mobility system and method is therefore needed that facilitates the seamless exchange of media content and interaction between different devices within a network. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to communications. More specifically, this disclosure relates to proximity session mobility. In one illustrative embodiment, a system and method for seamless exchange and interaction of multimedia content between communication devices in a network are disclosed. The method can include the discovery and identification of devices within proximity of a sending device. The found devices can be authenticated through unique identifiers established during registration. Connection requirements can be determined based on the identifiers associated with the found devices and the sending device. In turn, the sender can establish a connection with the found devices using the connection requirements. The exchanged content can be, but is not limited to, multimedia based information, applications, contacts, virtual desktop sessions, remote desktop sessions or virtual mobile sessions. The sending device can share or serve as a remote control to redirect and navigate the content, with a simple action or a gesture command, to the found device. The shared multimedia content, can either reside on the sender's mobile device or on a remote server within a connected network. The multimedia sharing supports one-to-one and one-to-many topologies.

Numerous advantages can be offered by the illustrative embodiment described above. Logging into a remote device before sharing or sending information has been removed as well as credential exchanges required prior to collaboration. In addition, the device can be used as a remote control to redirect the session and to navigate the interaction within a new destined session. The proximity sessions mobility is not restricted to just sharing of multimedia but potentially can be used to instantly transfer information from one small and low end device to a larger and higher display quality device for appeal and visual effect enhancements. Bidirectional collaborative interaction can be achieved with devices that have different makes and models within a connected network. Many additional advantages of the present disclosure will become apparent to those skilled in the relevant art as provided for in the following description.

Figure 2:
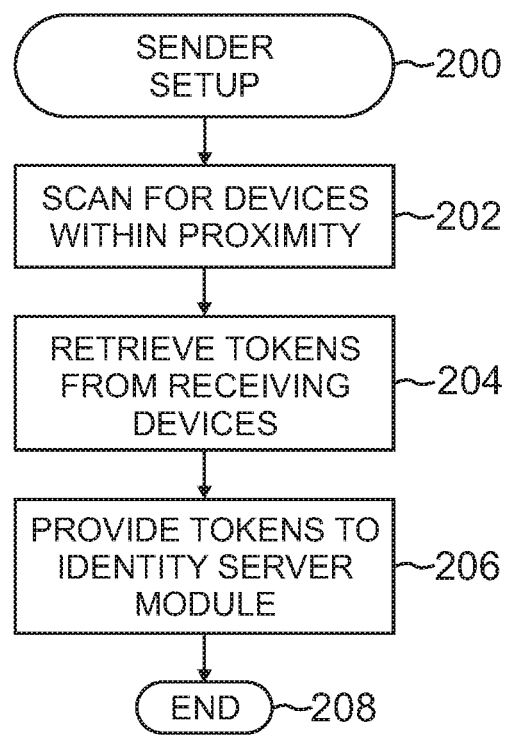
FIG. 2 is a flow chart depicting illustrative procedures for setting up devices in accordance with one or more aspects of the present disclosure.
Figure 3:
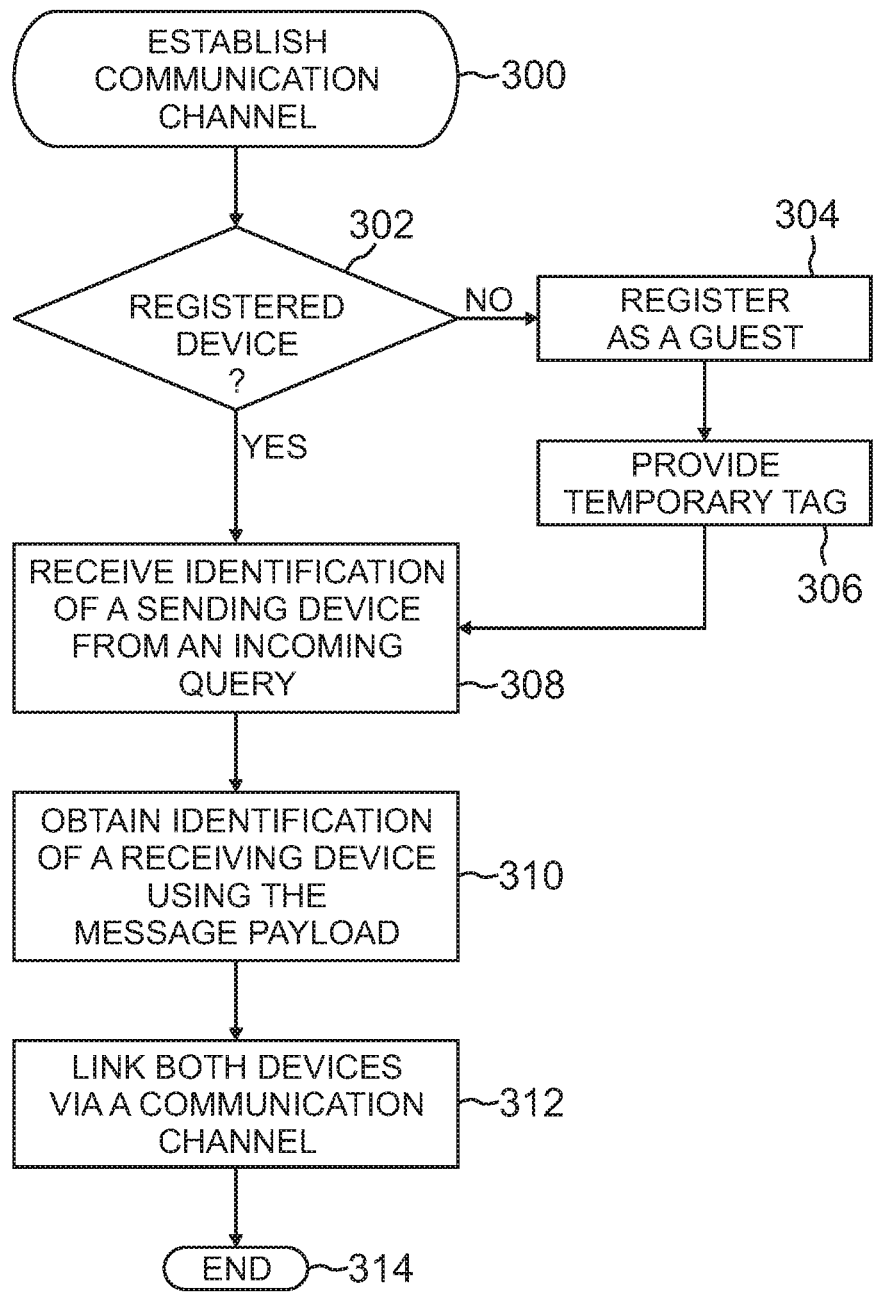
FIG. 3 is a flow chart depicting illustrative procedures for establishing a communication channel between devices in accordance with one or more aspects of the present disclosure.
Figure 4:
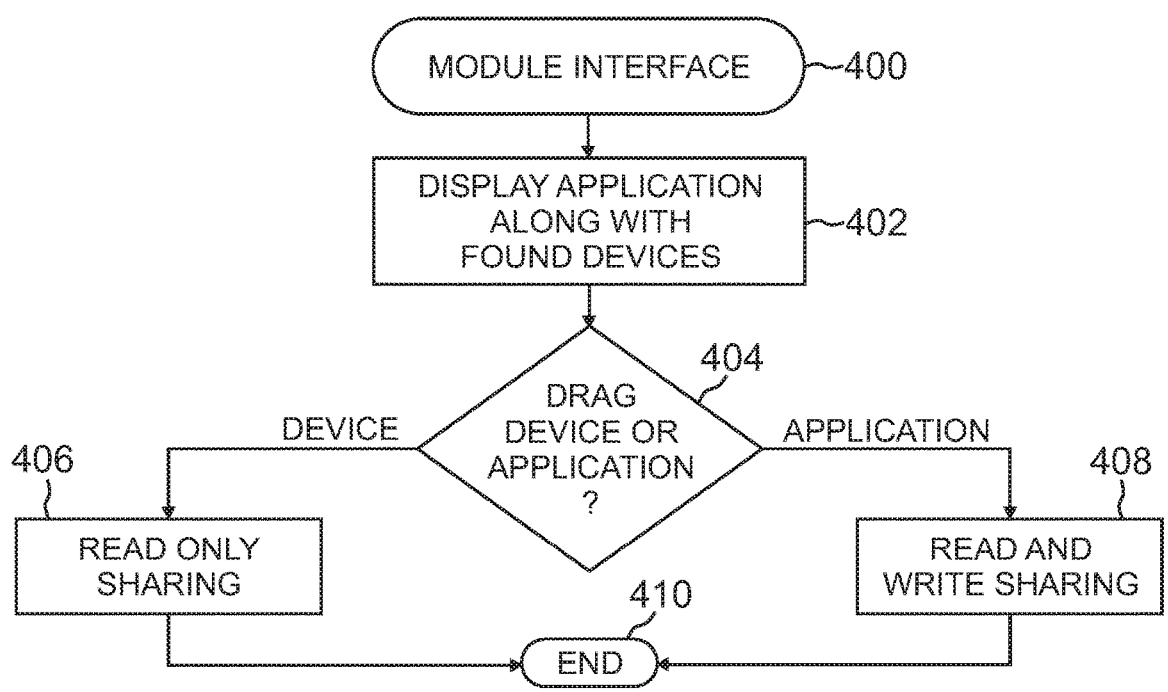
FIG. 4 is a flow chart depicting illustrative procedures for sharing information on a user interface provided by an exchange agent module in accordance with one or more aspects of the present disclosure.

Exemplary systems for exchanging content will be described in FIGS. 1, 5 and 7. FIGS. 2 through 4 will provide exemplary procedures for establishing a communication channel between devices. FIG. 6 discloses procedures for establishing a streaming session between devices while FIG. 8 provides procedures for a reverse lookup for proper identification of a receiver. In this disclosure, devices can be referred to as communication devices that can be mobile or not. These devices can include tablets, mobile phones, smartphones, personal digital assistants, handheld computers, standalone computers, conference devices or the like. The communication devices can also be referred to as sending devices and receiving or found devices.

Figure 1:
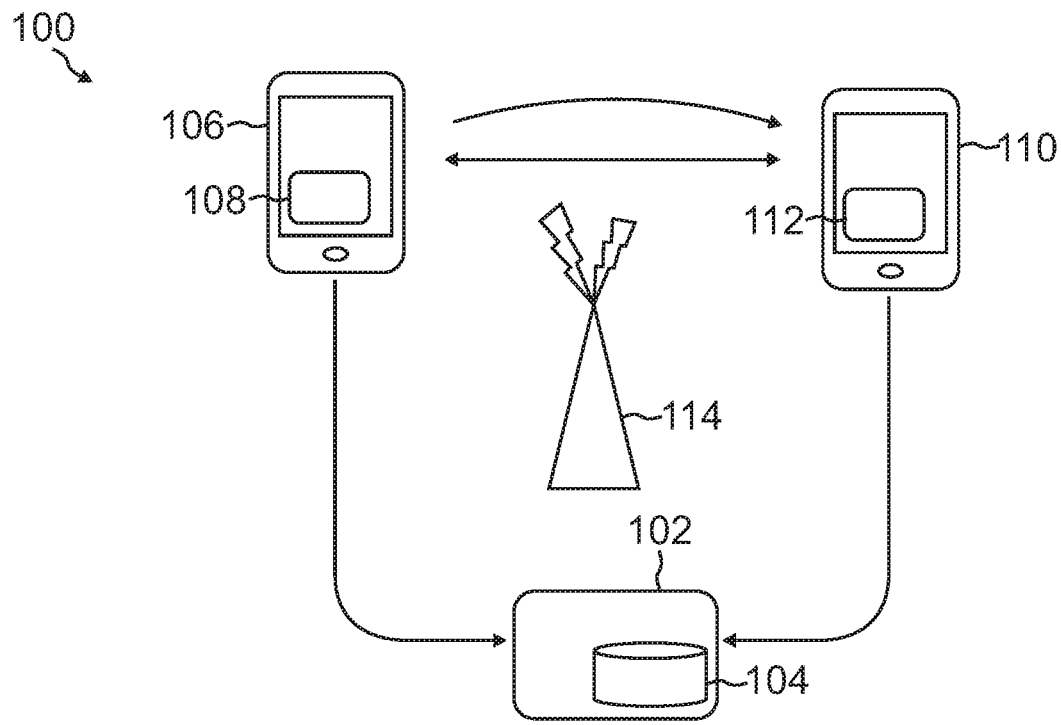
FIG. 1 is an exemplary system for sharing information between devices within proximity in accordance with one or more aspects of the present disclosure.

Turning now to FIG. 1, an exemplary system 100 for sharing information between communication devices 106 and 110 within proximity in accordance with one or more aspects of the present disclosure is provided. The system 100 can include an identity server module 104 operating on a server 102 that can be wirelessly connected to a plurality of communication devices 106 and 110 having exchange agent modules 108 and 112. Communications between them can be facilitated through a wireless interface 114 distributed within proximity of the devices 106 and 110. Those skilled in the relevant art will appreciate that fewer or more components can be represented within the system 100 and are not limited to those shown. For example, while two devices 106 and 110 have been provided, many more can be shown each interconnected with one another through communication channels defined by the identity server module 104.

Proximity session mobility can be applied to any devices 106 and 110. It is desirable or often necessary for applications to share data between these services. The modules 108 and 112, or at least components thereon, can be used as add-ons to existing applications or devices 106 and 110. For example, the exchange agent modules 108 and 112 running thereon can be downloaded onto existing mobile phones and or added to conference phones. The wireless interface 114, in association with the identity server module 104 on the server 102, can connect components within the system 100. Communications between the devices 106 and 110 and to the server 102 can be facilitated through the interface 114. The interface 114 can connect with the server 102 wirelessly or through a wireline connection known to those skilled in the relevant art.

Continuing with FIG. 1, the identity server module 104 can operate on a traditional server 102. The server 102 can include an operating system and software instructions, memory, at least one processor and a network interface. The server can process requests and typically handle high volumes of transactions and large amount of queries for communication and data processing. The identity server module 104 can provide information such as a device's name, number, Internet Protocol (IP) address and potentially, location. The module 104 can also provide a mechanism by which the devices 106 and 110 can establish a communication channel. The location of the devices 106 and 110 can be determined by observing one device paired with a static device such as a conference phone. The location information can be used to enhance the session experience by leveraging what the area has to offer, for example, local printers. This information can be used to populate presence information.

The exchange agent modules 108 and 112 on the communication devices 106 and 110 can be responsible for identifying devices in proximity and managing the sharing protocol. Operationally, each of the devices 106 and 110 can maintain a wireless interface for communication with one another and the identity server module 104 on the server 102. Referring to FIG. 2, a flow chart depicting illustrative procedures for setting up these devices 106 and 110 in accordance with one or more aspects of the present disclosure is provided. The procedures can begin at block 200. The exchange agent modules 108 and 112 can be downloaded or pre-installed on each of the devices 106 and 110. The communication devices 106 and 110 can register with the identity server module 104 which assigns the device a unique device address or identifier. These identifiers can be referred to as tokens with usages for these tokens becoming apparent from the disclosure provided below. Those skilled in the relevant art will appreciate that the devices 106 and 110 can be registered with the module 104 using a number of different techniques.

Once activated, the exchange agent module 108 on the sending device 106 can scan for devices 110 at block 202. The exchange agent module 108 on the sending device 106 can scan for nearby devices to identify available receiving devices 110 within proximity. Numerous types of scanning techniques can be used by the sending device 106. The scanning techniques can include near field communications (NFC), Bluetooth™, graphical tag recognition, facial recognition and global positioning system (GPS) signaling or wireless networks, depending on the options and the state (on/off) of protocols available on the receiving devices 110. Those skilled in the relevant art will appreciate that a combination of these techniques can be implemented and used by the sending device 106.

Information about receiving devices 110 can be reported back to the sending device 106. These found devices 110 can be displayed on a graphical display of the sending device 106 along with any other information about the receiving devices 110 in proximity with proper user identity which is stored in the identity server 102. For example, the sending device 106 can locate a number of different devices in proximity, but only those that have registered with the identity server module 104 are shown on the display of the sending device 106. After scanning is completed, the exchange agent module 108 on the sending device 106 now has a unique token for found devices 110. At block 204, these tokens are retrieved. These unique tokens as described earlier can be the information that was provided by the identity server module 104 when the devices 110 were registered. These tokens can then be sent to the identity server module 104 at block 206. The identity server module 104 can pull up information or communicate with all devices 106 and 110 given that the identifiers for them are known. The procedures can end at block 208.

In one embodiment, the identity server module 104 can send or push updates to known devices 106 and 110 so that they can communicate with each other. This can include auto pairing the Bluetooth™ radios on the devices 106 and 110 using the identity server module 104 as a mediator. Uniform resource links or IP addresses for the communication devices 106 and 110 can be sent to another device.

When the receiving device 110 has been located, communication between the sending device 106 and the receiving device 110 can be established and more specifically, the exchange agent modules 108 and 112 therein. FIG. 3 is a flow chart depicting illustrative procedures for establishing a communication channel between the devices 106 and 110 in accordance with one or more aspects of the present disclosure. The procedures can begin at block 300. The exchange agent module 108 on the sending device 106 can use the previously identified information to validate the receiving device 110 with the identity server module 104 and collect more information for connection requirements.

At decision block 302, the sending device 106 can determine whether the receiving device 110 within the previous scan was registered properly. The receiving device 110 should have been registered, as guest or known account, with the identity server module 104 on the server 102 prior to communicating with the sending device 106. Within a connected network, it is assumed that all the communication devices 106 and 110 are already authenticated, and each device is dynamically assigned a unique identifier, i.e. an IP address, Media Access Control (MAC) address, electronic mail address or phone number so that they can be discovered by other devices.

When the receiving device 110 has not been registered, the device 110 can be prompted to register as a guest when the device enters into the system 100 or detected by the wireless interface 114 at block 304. The identity server module 104 can also provide a temporary tag which acts as an identifier for the device 110 at block 306. In one embodiment, the assigned tag can be used by other devices, for example, via a camera scanning method. The tag can contain an address or a Uniform Resource Identifier (URI) referencing the other device. It can also be used to derive the address or URI via a reverse lookup. The temporary guest account can also be established for the sending device 106 and can be setup through similar methods.

At block 308, the identity server module 104 can receive identification of a sending device 106 from an incoming query. The identity server module 104 can know the identification of both parties through the query. The first identification can be obtained from the incoming query which contains the identification such as the token, IP address, MAC address etc. of the sending device 106. The identification of the receiving device 110 can be obtained from the message payload which contains the identifier for the receiving device 110 at block 310. With both identifications known, the identity server module 104 can initiate a background operation to link both devices via a communication channel at block 312. The exchange agent module 108 on the sending device can then establish the sharing connection with the exchange agent module 112 on the receiving device 110. The procedures can end at block 314.

The channel established between the sending device 106 and the receiving device 110 can either be peer-to-peer or client-server based. In one embodiment, the communication channel between the devices 106 and 110 is accomplished via a Transmission Control Protocol (TCP)/User Datagram Protocol (UDP) connection or Short Message Service (SMS) messaging. The connection can be terminated either by the sending device 106 or by a proximity detection mechanism or remotely via an administrative interface on the server 102 having the identity server module 104. In one embodiment, activity on the sending device 106 can be monitored by the receiving device 110 or identity server module 104 such that after a period of inactivity the session can be closed. Alternatively, the sending device 106 can disconnect itself after the period of inactivity.

Content can be provided or shared between the sending device 106 and receiving device 110. FIG. 4 is a flow chart depicting illustrative procedures for sharing information on a user interface provided by an exchange agent module 108 in accordance with one or more aspects of the present disclosure. The procedures can begin at block 400. With a connection established, a graphical display can show depictions of the identified or receiving device 110 so that a user of the sending device 106 can either drag the application or media to be shared to the receiving devices 110 or drag the receiving devices 110 to the application or media to be shared at block 402. Instructions can be provided on the display of the sending device 106.

At decision block 404, the sending device 106 can determine whether the user has dragged the device 110 to the application or the application to the device 110. The display can provide graphical representations of both. At block 406, when the receiving device 110 is dragged to the application, the sending device 106 provides read only content to the receiving device 110. When the application is dragged to the receiving device 110, at block 408, the sending device 106 provides content which can be presented as read and write enabled to the receiving device 110. Those skilled in the relevant art will appreciate that other techniques can be implemented for content sharing. For example, a menu or button click can replace the dragging technique. The procedures can end at block 410.

When receiving static content, the receiving devices 110 can view and discard the provided information from the sending device 106. In one embodiment, the receiving devices 110 can save the content if the sending device 106 allows it prior to starting the shared session. For dynamic content, the receiving device 110 can edit, discard or push back the content to the sender or vice versa.

The proximity session mobility feature can be disabled remotely from the server 102 having the identity server module 104 in case of a lost or stolen device. The exchange agent modules 108 and 112 on the communication devices 106 and 110, or at least a portion thereof, can be implemented as a background service. The background service can wait for input from either the identity server module 104 or associated/paired devices. This can allow the exchange agent modules 108 and 112 to be passive and do much if not all of the work with minimal user interaction.

To illustrate proximity session mobility, an exemplary receiving device 110, in the form of a conference phone, and a sending device 106, in the form of a mobile phone, is presented. When the mobile phone 106 equipped with an exchange agent module 108 is pointed at the conference phone 110, also having an exchange agent module 112, the conference phone 110 can display a graphical representation of the mobile phone 106 in proximity as an identified device that can be shared. The user can push a button on the conference phone 110 to confirm and their virtual remote desktop can show up on the conference phone 110. The user of the mobile phone 106 can either use the conference phone keyboard to navigate the multimedia session or use the exchange agent module 108 to control the navigation. To terminate the sharing session, the mobile phone user can either initiate a disconnect action from the exchange agent module 108 on the mobile phone 106, or just allow out-of-range proximity detection to be activated by walking away from the conference room with the device.

Figure 5:
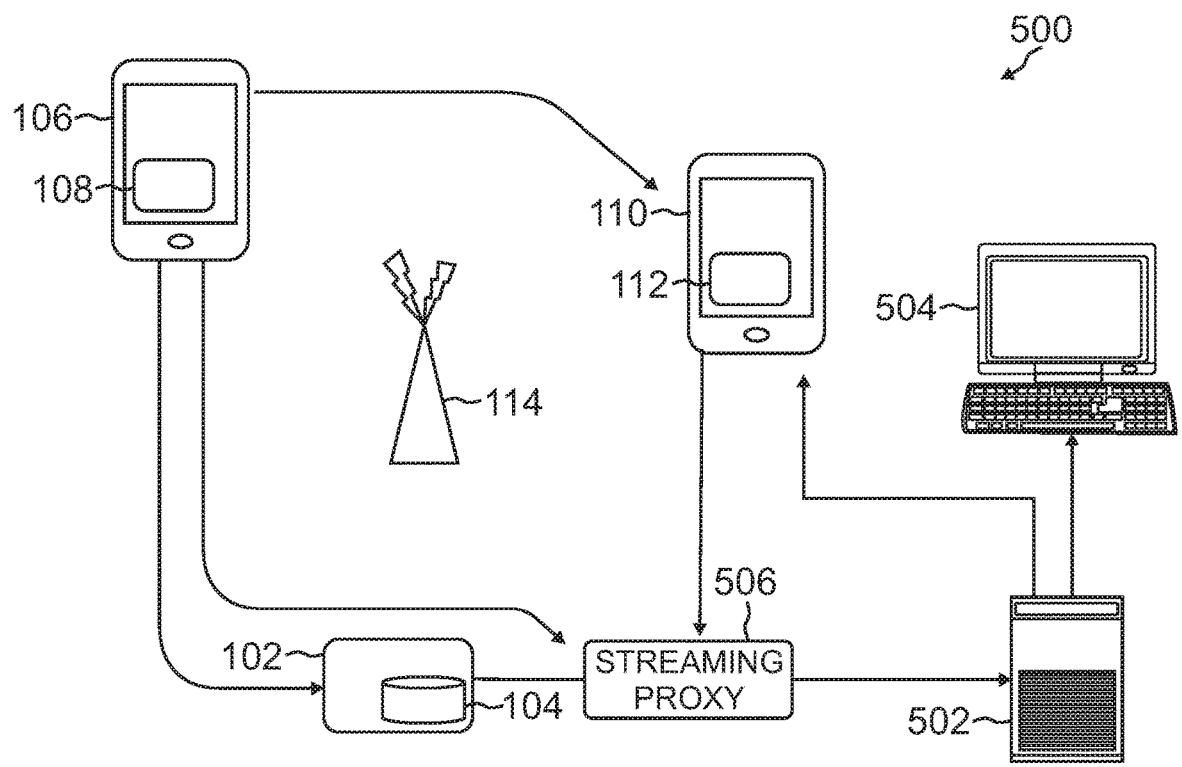
FIG. 5 is an exemplary system for providing a multimedia session through a streaming server in accordance with one or more aspects of the present disclosure.
Figure 6:
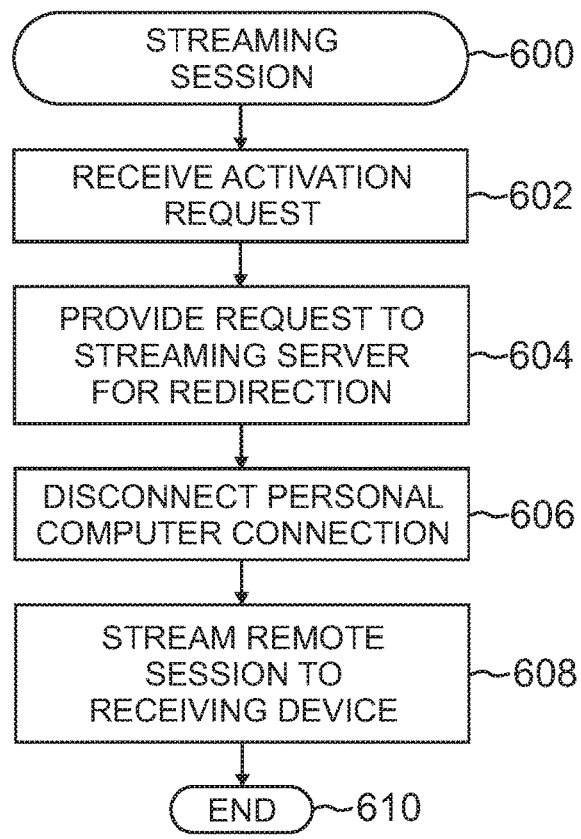
FIG. 6 is a flow chart depicting illustrative procedures for providing a streaming session in accordance with one or more aspects of the present disclosure.

Turning to FIG. 5, an exemplary system 500 for providing a multimedia session through a streaming server 502 in accordance with one or more aspects of the present disclosure is provided. The system 500 can include an identity server module 104 operating on a server 102 that can be wirelessly connected to a plurality of communication devices 106 and 110 having exchange agent modules 108 and 112. Communications between them can be facilitated through a wireless interface 114 distributed within proximity of the devices 106 and 110. For the case of using a mobile device as a remote control to redirect and navigate a remote session, the system 500 is the same as above with the addition of the streaming server 502 and streaming proxy 506. Those skilled in the relevant art will appreciate that fewer or more components can be represented within the system 100 and are not limited to those shown.

Through the addition of the streaming server 502 and streaming proxy 506, the previous system 100 can be altered for other applications such as video streaming redirection using the sending device 106 as a remote control. For example, the user of the sending device 106 can simply beam itself through its exchange agent module 108 to a receiving device 110, which can be in the form of a video conferencing unit. The conferencing unit 110 can be connected to a monitor or projector that displays the sending device's desktop session for presentation to the rest of the participants. The streaming server 502 can operate on a traditional server. The server can include an operating system and software instructions, memory, at least one processor and a network interface. The server can process requests and typically handle high volumes of transactions and large amount of queries for communication and data processing.

The streaming server 502 can be managed through the streaming proxy 506. The streaming proxy 506 described herein can be implemented as logical operations and/or modules attached to the server 502 or can be implemented on a separate physical component itself. Through the system 500, the sending device 106 can be the user's link to their workspace or session. As the user moves, they retain the ability to project, forward and recall their session to and from other receiving devices 110.

A multimedia session can be a remote desktop session such as VMware View™. The streaming server 502 can be responsible for serving the multimedia data to a remote location. In operation, the streaming server 502 can use a Remote Desktop Protocol (RDP), Personal Computer over Internet Protocol (PCoIP), Virtual Network Computing (VNC), etc. The streaming proxy 506 can be responsible for redirecting and multicasting the traffic to a newer location identified by the exchange agent module 108.

The redirection technique employs two alternatives. In one embodiment, the streaming proxy 506 can instruct the streaming server 502 to stop the current streaming and start a new one to a new end point destination address. Alternatively, the streaming proxy 506 can redirect the streaming data between the streaming server 502 and the new end point devices. Once the remote session is displayed at the receiving device 110, the sending device 106 can either let the receiving device 110 navigate the session or alternatively the sending device 106 can control the navigation via its exchange agent module 108. When there are multiple receiving devices 110, only the sending device 106 can navigate the content unless the control is passed to another receiving device 110.

Referring to FIG. 6, a flow chart depicting illustrative procedures for providing a streaming session in accordance with one or more aspects of the present disclosure is provided. The procedures can begin at block 600. Those skilled in the relevant art will appreciate that the procedures described herein can be interchanged and are not limited to the disclosed embodiment. Initially, the streaming server 502 can be serving content to the remote desktop session on the PC 504 as depicted in FIG. 5.

To control the streaming session, the receiving device 110 can register with the identity server module 104, which assigns the device 110 to a unique address. The exchange agent module 108 on the sending device 106 can scan for nearby devices to identify available receiving devices 110 within proximity. The exchange agent module 108 on the sending device 106 can use the identified information to validate with the identity server module 104 operating on the server 102. The identity server module 104 can collect more information for the reconnection requirements.

In turn, a sender operating the sending device 106 can press a share button which activates the request to the streaming proxy 506. At block 602, the streaming proxy 506 can receive the activation request. The streaming proxy 506 can provide the request to the streaming server 502 for redirection with provided destination information at block 604. The streaming server 502 can disconnect the connection to the PC 504 at block 606 and start streaming the remote session to the receiving device 110 at block 608. The procedures can end at block 610.

To illustrate streaming sessions, a PC 504 can initially display a virtual or physical desktop session running from their work station. When the user comes to a conference room and wants to show their presentation which is on their virtual or physical remote desktop, the user can point their mobile device 106 to the conferencing device 110 with the installed exchange agent module 108. The exchange agent module 108 on the mobile device 106 can display a graphical representation of the conferencing device 110 in proximity as an identified device that can be shared. The user can direct the exchange agent module 108 on the mobile device 106 to initiate a sharing session. In turn, the user's virtual or physical remote desktop can start projecting on the conference device's screen. The user can then either use the conference device's keyboard to navigate the presentation or use their same mobile phone application to control the navigation.

In one embodiment, the multimedia session can be recorded on a server and or transcoded in real-time. This can allow other participants without the required clients to view the multimedia content in a read only mode. For example, the video can be broadcasted to an authenticated or anonymous web server. The video can then be rendered via an HTML5 video tag and displayed natively in any HTML5 browser without the need for plugins or the like.

The sending device 106 can provide additional input to the session in the form a remote pointer. When the receiving device 110 registers to a private branch exchange (PBX) as a phone device, such as a session initiation protocol (SIP) phone, the extension can be used to do a reverse look up for the device's address. In this case, the extension can be programmed in a user sending device's contact list. The mobile application on the sending device 106 then can be extended to allow a sharing action in addition to the normal list of actions such as dial, chat, etc. This sharing action can provide seamless sharing session activation.

Figure 7:
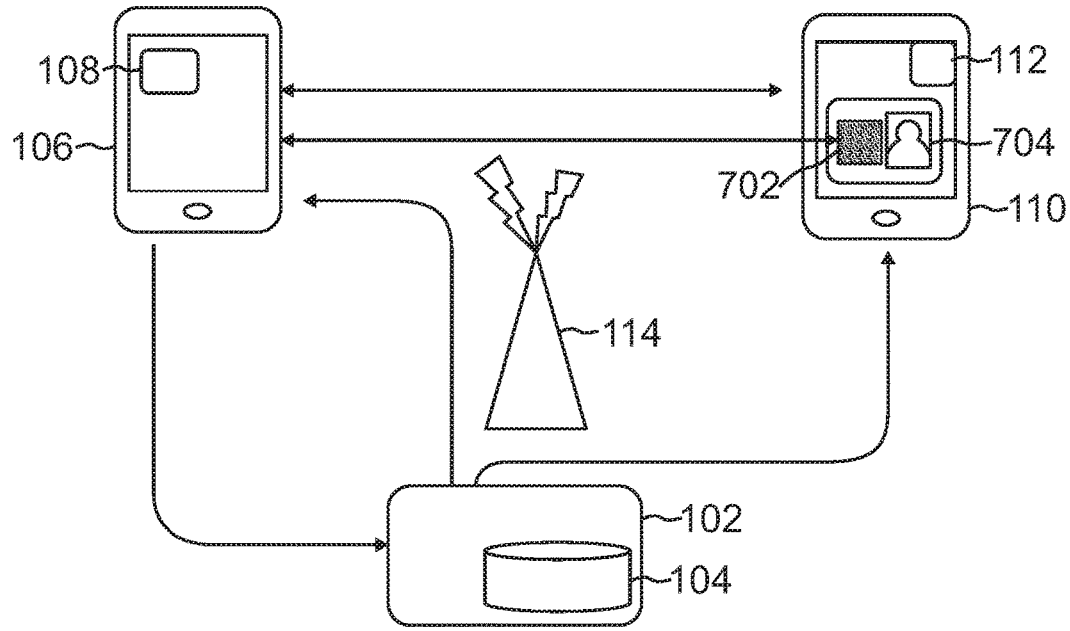
FIG. 7 is an exemplary system for providing a reverse lookup to establish a communication channel in accordance with one or more aspects of the present disclosure.
Figure 8:
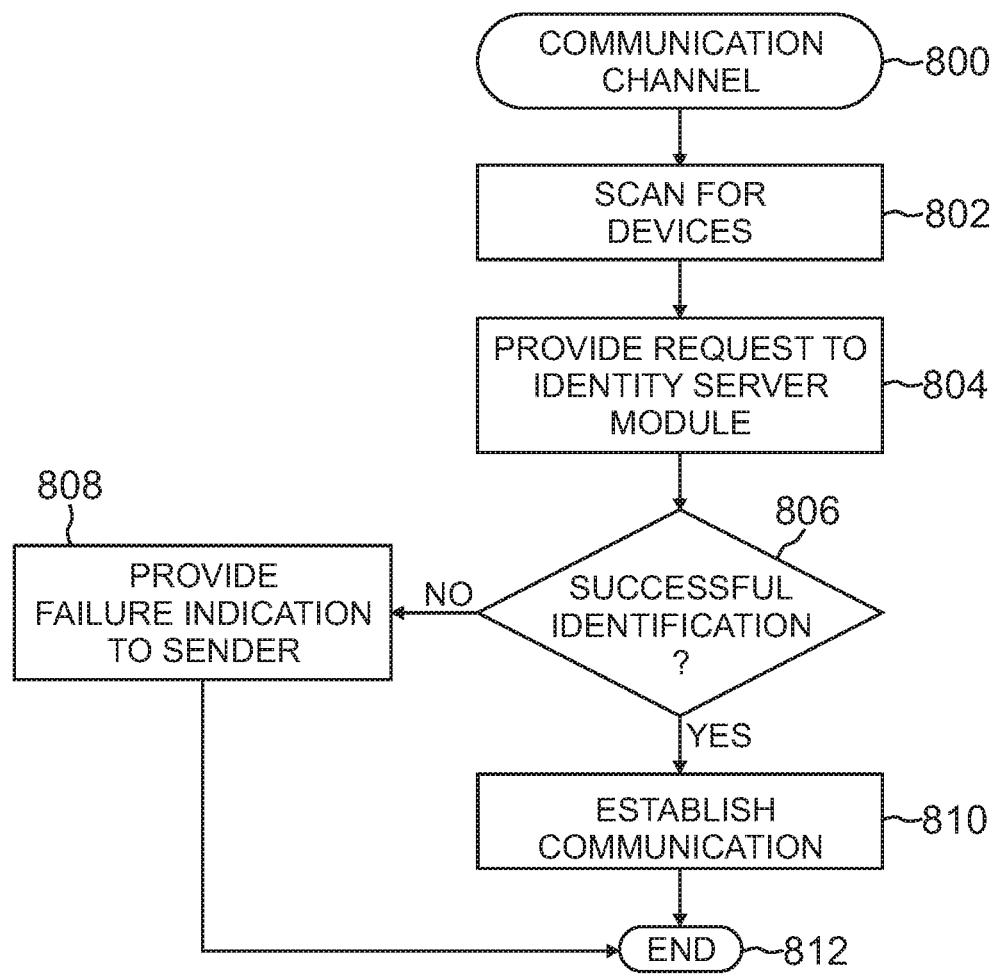
FIG. 8 is a flow chart depicting illustrative procedures for setting up the communication channel using reverse lookup in accordance with one or more aspects of the present disclosure.

FIG. 7 is an exemplary system 700 for providing a reverse lookup to establish a communication channel in accordance with one or more aspects of the present disclosure. The system 700 can include an identity server module 104 operating on a server 102 that can be wirelessly connected to a plurality of communication devices 106 and 110 having exchange agent modules 108 and 112. Communications between them can be facilitated through a wireless interface 114 distributed within proximity of the devices 106 and 110. Those skilled in the relevant art will appreciate that fewer or more components can be represented within the system 100 and are not limited to those shown.

In one embodiment, reverse lookup can occur through a Quick Response (QR) code 702 that can be associated with the receiving device 110. The QR code 702 can be a matrix barcode readable by a dedicated reader provided on the sending device 106. The code 702 can consist of black modules arranged in a square pattern on a white background. Other methods known to those skilled in the relevant art can be used to identify a user of the receiving device 110. For example, the receiver can be detected through facial recognition using a photo 704 provided on the device 110 or through a picture taken by the sending device 106.

FIG. 8 is a flow chart depicting illustrative procedures for setting up the communication channel using reverse lookup in accordance with one or more aspects of the present disclosure. The procedures can begin at block 800. At block 802, the sending device 106 can scan for receiving devices 110. In one embodiment, the sending device 106 can scan for the QR code 702 associated with the receiving device 110. Alternatively, or in combination therewith, the sender can take a picture of the user's face or use the photo 704 provided on the receiving device 110. In turn, a request can be built for the identity server module 104 that includes the receiving device's 110 tokens or other identification. The request can then be provided to the identity server module 104 at block 804.

The identity server module 104 can receive the request and perform a reverse lookup based on the token or identification in the request. In the case of a photo 704, the identity server module 104 operating on the server 102 would data mine a picture database using various facial recognition algorithms known to those skilled in the relevant art. When the identity server module 104 is unable to verify with a certain degree of precision who is within the photo 704, a list of top candidates can be sent back to the sending device 106 along with their thumbnails. The exchange agent module 108 can then provide a mechanism for the user to pick the correct candidate via a click, gestures etc. On failure to establish an identity for either client, the identity server module 104 can return a corresponding failure to the sending device 106 and the receiver is left untouched.

When a QR code 702 is used, the code 702 can be sent to the identity server module 104 to be evaluated after retrieved by the sending device 106. Alternatively, the exchange agent module 108 operating on the sending device 106 can be used to identify the receiving device 110. If the identity cannot be determined, a failure indicator is provided back to the sending device 106. Those skilled in the relevant art will appreciate that a combination of techniques for reverse lookup can be used.

At decision block 806, the sending device 106 can determine whether the identity server module 104 has successfully identified the receiving device 110. This is generally provided by a successful indicator given by the identity server module 104. When the identity server module 104 cannot determine the user of the receiving device 110, the sending device 106 can provide a failure indicator to the sender at block 808. Upon successful identification, however, the identity server module 104 would know how to communicate with both devices 106 and 110 since their network addresses would be stored in its database. The identity server module 104 can act as a broker between both devices 106 and 110 in order to establish a communication channel at block 810.

If the channel is over WiFi, it can forward initializations commands to each exchange agent module 108 and 112. These commands can include listening and allowing connections from the verified peer addresses. When the channel is over Bluetooth™, the identity server module 104 can automate the pairing such that user input is minimized. The commands sent from the server 102 to the devices 106 and 110 can involve, but are not limited to, enabling auto-discovery on the devices 106 and 110, obtaining information about perimeter devices from each exchange agent module 108 and 112, filtering out devices which are not part of the transaction, i.e. that are not the sending device 106 or the receiving device 110 and automatically pairing the devices 106 and 110. Both exchange agent modules 108 and 112 can now communicate over an established data channel. The procedures can end at block 812.

The technology described herein can be implemented as logical operations and/or modules. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

The figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A device, comprising:
    a server;
    an identity server module on the server storing tokens for automatic validation based on a proximity determination;
    wherein the identity server module determines a location of one or more of a sending device and a receiving device based on a pairing of the one or more sending device and the receiving device with a static device and provides location information of the receiving device to the sending device that is in proximity to the static device.

2. The device of claim 1, wherein the sending device comprises an exchange agent module capable of identifying the at least one other receiving device that is in proximity.

3. The device of claim 2, wherein identification information of the at least one other receiving device that is in proximity is shown on a display of the sending device.

4. The device of claim 2, wherein the exchange agent module can be used to terminate a communication between the sending device and the receiving device.

5. The device of claim 1, wherein the identity server module is capable of establishing a communication channel between the sending device and the at least one other receiving device that is in proximity.

6. The device of claim 5, wherein the communication channel is a peer-to-peer communication channel.

7. The device of claim 5, wherein the communication channel is a client-server based communication channel.

8. The device of claim 5, wherein the communication channel is a Transmission Control Protocol (TCP)/User Datagram Protocol (UDP) connection or Short Message Service (SMS) messaging channel.

9. The device of claim 1, wherein the identity server module pushes updates to the sending device.

10. The device of claim 1, wherein the identity server module pushes updates to the receiving device.

11. The device of claim 1, wherein, when the receiving device has not been registered with the identity server module, the identity server module prompts a user of the receiving device to register as a guest.

12. The device of claim 1, wherein the identity server module provides a temporary tag that acts as an identifier.

13. The device of claim 1, wherein the receiving device is registered with the identity server module.

14. The device of claim 1, wherein the identity server module receives identification information of the sending device from an incoming query.

15. The device of claim 1, wherein the identity server module receives identification information of the receiving device from a query.

16. The device of claim 1, wherein the identity server module receives identification information of the receiving device from a message payload.

17. The device of claim 1, wherein content is shared between the receiving device and the sending device.

18. The device of claim 17, wherein the content comprises dynamic content.

19. The device of claim 17, wherein the content comprises read only content.

20. The device of claim 17, wherein the content comprises static content.

* * * * *